US012723107B2

(12) United States Patent
Al-haj Ali et al.

(10) Patent No.: US 12,723,107 B2
(45) Date of Patent: Sep. 1, 2026

(54) POLYMERIZATION PROCESS AND ARRANGEMENT

(71) Applicant: Borealis AG, Vienna (AT)

(72) Inventors: Mohammad Al-haj Ali, Porvoo (FI); Charlotta Weber, Stockholm (SE); Henry Sleijster, Sittard-Geleen (NL); Noureddine Ajellal, Porvoo (FI); Mubashar Sattar, Porvoo (FI)

(73) Assignee: BOREALIS GMBH, Vienna (AT)

( * ) Notice: Subject to any disclaimer, the term of this patent is extended or adjusted under 35 U.S.C. 154(b) by 671 days.

(21) Appl. No.: 18/039,835

(22) PCT Filed: Dec. 8, 2020

(86) PCT No.: PCT/EP2020/085081
§ 371 (c)(1),
(2) Date: Jun. 1, 2023

(87) PCT Pub. No.: WO2022/122125
PCT Pub. Date: Jun. 16, 2022

(65) Prior Publication Data
US 2024/0002552 A1 Jan. 4, 2024

(51) Int. Cl.
*C08F 2/06* (2006.01)
*C08F 6/12* (2006.01)
*C08L 23/08* (2025.01)

(52) U.S. Cl.
CPC .................. *C08F 2/06* (2013.01); *C08F 6/12* (2013.01); *C08L 23/08* (2013.01)

(58) Field of Classification Search
CPC . C08F 2/06; C08F 6/12; B01J 19/1856; B01J 19/2445
See application file for complete search history.

(56) References Cited

U.S. PATENT DOCUMENTS

2011/0172375 A1* 7/2011 Yeh .......................... C08F 6/003 526/74

FOREIGN PATENT DOCUMENTS

WO 2008024517 A2 2/2008
WO 2015010984 A1 1/2015
(Continued)

OTHER PUBLICATIONS

International Search Report of Application No. PCT/EP2020/085081 Dated Aug. 26, 2021.

*Primary Examiner* — Fred M Teskin
(74) *Attorney, Agent, or Firm* — Lippes Mathias LLP

(57) ABSTRACT

A continuous polymerization process includes combining a first hydrocarbon stream with hydrocarbons recycled from at least one downstream process step to a first combined hydrocarbon stream; continuously polymerizing a first olefin monomer and a first comonomer in the presence of a first polymerization catalyst in a solvent to produce a first solution; withdrawing a first exhaust stream of the first solution; separating the first exhaust stream to a first primary hydrocarbon stream and a first concentrated solution stream; recycling the first primary hydrocarbon stream; separating the first concentrated solution stream to a first secondary hydrocarbon stream and a first polymer product stream; recycling the first secondary hydrocarbon stream; and repeating the combining, continuously polymerizing, withdrawing, separating, recycling, separating, and recycling for a second solution.

17 Claims, 5 Drawing Sheets

(56) References Cited

FOREIGN PATENT DOCUMENTS

| | | | |
|---|---|---|---|
| WO | 2017108951 | A1 | 6/2017 |
| WO | 2017108963 | A1 | 6/2017 |
| WO | 2019086987 | A1 | 5/2019 |

* cited by examiner

POLYMERIZATION PROCESS AND ARRANGEMENT

CROSS REFERENCE TO RELATED APPLICATIONS

This is a 371 of PCT Application No. PCT/EP2020/085081, filed Dec. 8, 2020 the contents of which are incorporated by reference herein in their entirety.

FIELD OF THE DISCLOSURE

The present disclosure relates to a polymerization process, and particularly to a solution polymerization process. The present disclosure relates to a corresponding polymerization arrangement.

BACKGROUND OF THE DISCLOSURE

Document WO 2017/108951 A1 discloses an in-line blending process for polymers comprising: (a) providing two or more reactor-low pressure separator units in parallel configuration, each reactor-low pressure separator unit comprising one reactor fluidly connected to one low pressure separator downstream and further a recycling line connecting the low pressure separator back to the corresponding reactor; (b) polymerizing olefin monomers having two or more carbon atoms in each of the reactors in solution polymerisation; (c) forming an unreduced reactor effluents stream including a homogenous fluid phase polymer-monomer-solvent mixture in each of the reactors, (d) passing the unreduced reactor effluents streams from each of the reactors through the corresponding low pressure separators, whereby the temperature and pressure of the low pressure separators is adjusted such that a liquid phase and a vapour phase are obtained, whereby yielding a polymer-enriched liquid phase and a polymer-lean vapour phase, and (e) separating the polymer-lean vapour phase from the polymer-enriched liquid phase in each of the low-pressure separators to form separated polymer-lean vapour streams and separated polymer-enriched liquid streams; (f) combining the polymer-enriched liquid streams from step (e) in a further low-pressure separator and/or a mixer to produce a combined polymer-enriched liquid stream; (g) reintroducing the polymer-lean vapour streams from step (e) via recycling lines into the corresponding reactors.

Document WO 2017/108969 A1 discloses a process for polymerising olefins in a solution and withdrawing a stream of the solution from the polymerisation reactor and passing it to a sequence of heating steps. The heated solution is passed to a separation step, which is conducted at a pressure of no more than 15 bar and in which separation step a liquid phase comprising the polymer and a vapour phase coexist. A vapour stream and a concentrated solution stream comprising the polymer are withdrawn from the separation step. At least a part of the vapour stream is passed to the first polymerisation reactor, to the second polymerisation reactor or to both.

A problem with both of the processes above is that they do not allow the production of two different types of polyethylene at the same time but the product streams are combined and the combined product is then sent to extrusion.

Document WO 2019/086987 A1 discloses integrated solution polymerization process comprising i. forming a compound ethylene stream by compressing ethylene in a single compressor;

ii. dividing said compressed ethylene stream into a first ethylene feed stream and a second ethylene feed stream;

iii. injecting said first ethylene feed stream, a hydrocarbon solvent, a first catalyst system, optionally one or more C3 to C12 alpha olefins and optionally hydrogen into a first polymerization reaction train operating at a first temperature and first pressure to produce a first ethylene polymer solution;

iv. injecting said second ethylene feed stream, a hydrocarbon solvent, a second catalyst system, one or more C3 to C12 alpha olefins and optionally hydrogen into a second polymerization reaction train operating at a second temperature and second pressure to produce a second ethylene polymer solution; v. directing said first ethylene polymer solution to a first polymer separation unit operation to produce a first liquid stream containing said first solvent and unreacted monomer and a crude first ethylene polymer;

v. directing said second ethylene polymer solution to a second polymer separation unit operation to produce a second liquid stream containing said second solvent and unreacted monomer and a crude second ethylene polymer;

vi. directing said first liquid stream and said second liquid stream to a single distillation unit;

vii. finishing said crude first ethylene polymer in a finishing operation containing a pellet extruder and a pellet stripper; and viii. finishing said crude second ethylene copolymer in a second finishing operation containing a devolatilizing extruder, with the proviso that said second finishing extruder does not include a pellet stripper.

A problem with the above process is that it does not include the short recycle, i.e. recycling hydrocarbons separated directly after the polymerization reaction train back to upstream of the polymerization reaction train. This consumes energy and requires a relatively large equipment for distillation of the hydrocarbons in later process stages.

BRIEF DESCRIPTION OF THE DISCLOSURE

An object of the present disclosure is to provide a process and an arrangement for implementing the process to overcome the above problems.

The object of the disclosure is achieved by a process and an arrangement, which are characterized by what is stated in the independent claims. The preferred embodiments of the disclosure are disclosed in the dependent claims.

The disclosure is based on the idea of providing a polymerization process, comprising providing a first hydrocarbon stream comprising first olefin monomer, first comonomer and solvent in a first providing step, wherein solvent is obtained from a solvent source;

combining the first hydrocarbon stream with hydrocarbons recycled from at least one downstream process step to a first combined hydrocarbon stream in a first combining step;

polymerizing the first olefin monomer and the first comonomer in the presence of a first polymerization catalyst in a first polymerization step in the solvent to produce a first solution comprising a first polymer of the first olefin monomer and the first comonomer;

withdrawing a first exhaust stream of the first solution in a first withdrawing step;

separating the first exhaust stream to a first primary hydrocarbon stream and a first concentrated solution stream in a first primary separation step;

recycling the first primary hydrocarbon stream to the first combining step in a first primary recycling step;

separating the first concentrated solution stream to a first secondary hydrocarbon stream and a first polymer product stream in a first secondary separation step;

recycling the first secondary hydrocarbon stream to the first combining step in a first secondary recycling step;

providing a second hydrocarbon stream comprising second olefin monomer, second comonomer and solvent in a second providing step, wherein solvent is obtained from the solvent source;

combining the second hydrocarbon stream with hydrocarbons recycled from at least one downstream process step to a second combined hydrocarbon stream in a second combining step;

polymerizing the second olefin monomer and the second comonomer in the presence of a second polymerization catalyst in a second polymerization step in the solvent to produce a second solution comprising a second polymer of the second olefin monomer and the second comonomer;

withdrawing a second exhaust stream of the second solution in a second withdrawing step;

separating the second exhaust stream to a second primary hydrocarbon stream and a second concentrated solution stream in a second primary separation step;

recycling the second primary hydrocarbon stream to the second combining step in a second primary recycling step;

separating the second concentrated solution stream to a second secondary hydrocarbon stream and a second polymer product stream in a second secondary separation step; and recycling the second secondary hydrocarbon stream to the second combining step in a second secondary recycling step, wherein the first providing step and the second providing step are performed in parallel;

the first combining step and the second combining step are performed in parallel;

the first polymerization step and the second polymerization step are performed in parallel;

the first withdrawing step and the second withdrawing step are performed in parallel;

the first primary separation step and the second primary separation step are performed in parallel;

the first primary recycling step and the second primary recycling step are performed in parallel;

the first secondary separation step and the second secondary separation step are performed in parallel; and the first secondary recycling step and the second secondary recycling step are performed in parallel.

The disclosure is also based on the idea of providing a polymerization arrangement, comprising a fresh solvent source arranged to provide solvent for a first hydrocarbon stream and a second hydrocarbon stream, the first hydrocarbon stream comprising first olefin monomer, first comonomer and solvent, and the second hydrocarbon stream comprising second olefin monomer, second comonomer and solvent;

a first olefin monomer source arranged to provide first olefin monomer for the first fresh hydrocarbon stream;

a first comonomer source arranged to provide first comonomer for the first fresh hydrocarbon stream;

a first combining means in fluid connection with the solvent source, the first olefin monomer source and the first comonomer source, wherein the first combining means is arranged to combine the first hydrocarbon stream with a stream of recycled hydrocarbons to a first combined hydrocarbon stream;

a first polymerization reactor train in fluid connection with the combining means and arranged to polymerize olefin monomer and comonomer in the presence of a polymerization catalyst in solvent to produce a first solution comprising a first polymer of the olefin monomer and the comonomer;

a first primary separation device in fluid connection with the first polymerization reactor train and arranged to separate a first exhaust stream of the first solution withdrawn from the first polymerization reactor train to a first primary hydrocarbon stream and a first concentrated solution stream;

a first primary recycling means in fluid connection with the first primary separation device and the first combining means for recycling the first primary hydrocarbon stream to the first combining means;

a first secondary separation device in fluid connection with the first primary separation device, wherein the first secondary separation device is arranged to separate the first concentrated solution stream to a first secondary hydrocarbon stream and a first polymer product stream;

a first secondary recycling means in fluid connection with the first secondary separation device and the first combining means for recycling the first secondary hydrocarbon stream to the first combining means;

a second combining means in fluid connection with the solvent source and arranged to combine the second hydrocarbon stream with a stream of recycled hydrocarbons to a second combined hydrocarbon stream;

a second polymerization reactor train in fluid connection with the combining means and arranged to polymerize olefin monomer and comonomer in the presence of a polymerization catalyst in solvent to produce a second solution comprising a second polymer of the olefin monomer and the comonomer;

a second primary separation device in fluid connection with the second polymerization reactor train and arranged to separate a second exhaust stream of the second solution withdrawn from the second polymerization reactor train to a second primary hydrocarbon stream and a second concentrated solution stream;

a second primary recycling means in fluid connection with the second primary separation device and the second combining means for recycling the second primary hydrocarbon stream to the second combining means;

a second secondary separation device in fluid connection with the second primary separation device, wherein the second secondary separation device is arranged to separate the second concentrated solution stream to a second secondary hydrocarbon stream and a second polymer product stream;

a second secondary recycling means in fluid connection with the second secondary separation device and the second combining means for recycling the second secondary hydrocarbon stream to the second combining means wherein

- the first polymerization reactor train and the second polymerization reactor train are arranged to operate in parallel;
- the first primary separation device and the second separation device are arranged to operate in parallel;
- the first primary recycling means and the second primary recycling means are arranged to operate in parallel;
- the first secondary separation device and the second secondary separation device are arranged to operate in parallel; and
- the first secondary recycling means and the second secondary recycling means are arranged to operate in parallel.

An advantage of the process and the arrangement of the disclosure is that it allows the production of two different types of polyethylene at the same time while allowing efficient recycling of hydrocarbons. Additionally, the process and the arrangement provide a low specific energy consumption measured in kW/ton PE. The process and the arrangement allow using a smaller capacity recovery section and thus reduces the capital expenditure of the plant compared to the known solutions. Further, the process and the arrangement allow using different comonomers in each line making them more versatile and thus allowing the production of completely different products compared to the known solutions.

BRIEF DESCRIPTION OF THE DRAWINGS

In the following the disclosure will be described in detail by means of preferred embodiments with reference to the accompanying drawings, in which.

DETAILED DESCRIPTION OF THE DISCLOSURE

The disclosure relates to a polymerization process for polymerising one or more olefins in two or more polymerization reactors in solution, i.e. a solution polymerization process. The solution polymerization process is typically conducted in a solvent in which the monomer, eventual comonomers, eventual chain transfer agent and the polymer formed in course of the process are dissolved. Such processes are disclosed, among others, in documents WO 1997/036942 A, WO 2006/083515 A, WO 2008/082511 A, and WO 2009/080710 A.

The disclosure relates also to a corresponding polymerization arrangement.

Providing Hydrocarbons

The polymerization process comprises a first providing step, in which a first hydrocarbon stream comprising first olefin monomer, first comonomer and solvent is provided.

Preferably, the first hydrocarbon stream comprises fresh first olefin monomer, fresh first comonomer and fresh solvent. The solvent is obtained from a solvent source 1*a*, for example via line 11*a*. The first olefin monomer is obtained from a first olefin monomer source 1*b*, for example via line 11*b*. The first comonomer is obtained from a first comonomer source 1*c*, for example via line 11*c*. The feed of first olefin monomer from the first olefin monomer source 1*b*, the feed of first comonomer from the first comonomer source 1*c* and feed of solvent from the solvent source 1*a* are combined to obtain the first hydrocarbon stream. For example, the feed of first olefin monomer, the feed of first comonomer and the feed of solvent are combined in a first feed tank 2. Alternatively, the feed of first olefin monomer, the feed of first comonomer and the feed of solvent are combined in a location upstream of the first feed tank 2. For the sake of clarity, the first olefin monomer source 1*b* and the first comonomer source 1*c* are not visible in FIGS. 2 and 3.

The polymerization process comprises a second providing step, in which a second hydrocarbon stream comprising second olefin monomer, second comonomer and solvent is provided. Preferably, the second hydrocarbon stream comprises fresh second olefin monomer, fresh second comonomer and fresh solvent. The solvent is obtained from the solvent source 1*a*. The first providing step and the second providing step are performed in parallel. In other words, the first providing step and the second providing step are performed essentially at the same time.

Figure 1A:
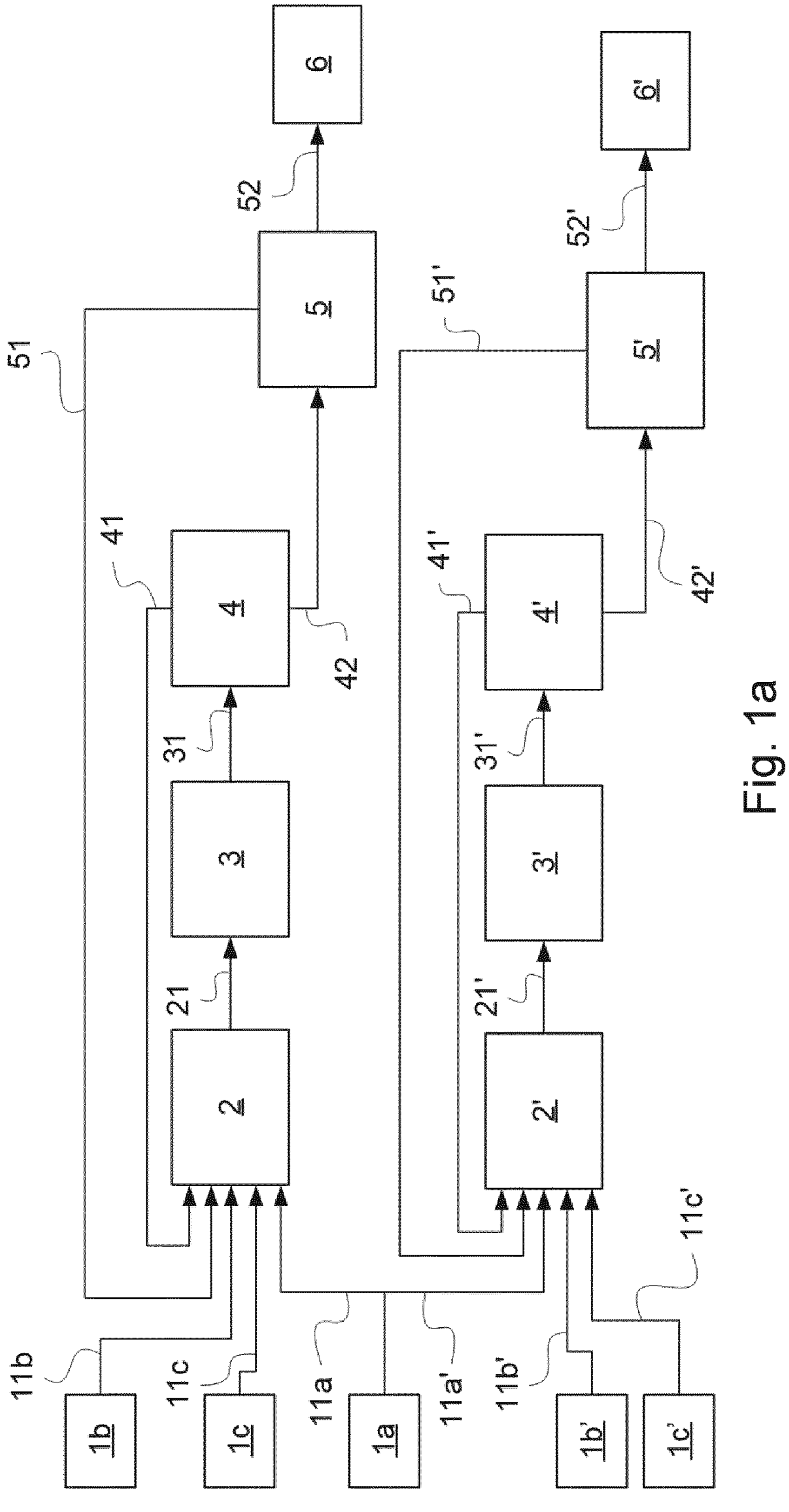
FIG. 1*a* is a schematic drawing of a polymerization process according to an embodiment of the disclosure.
Figure 1B:
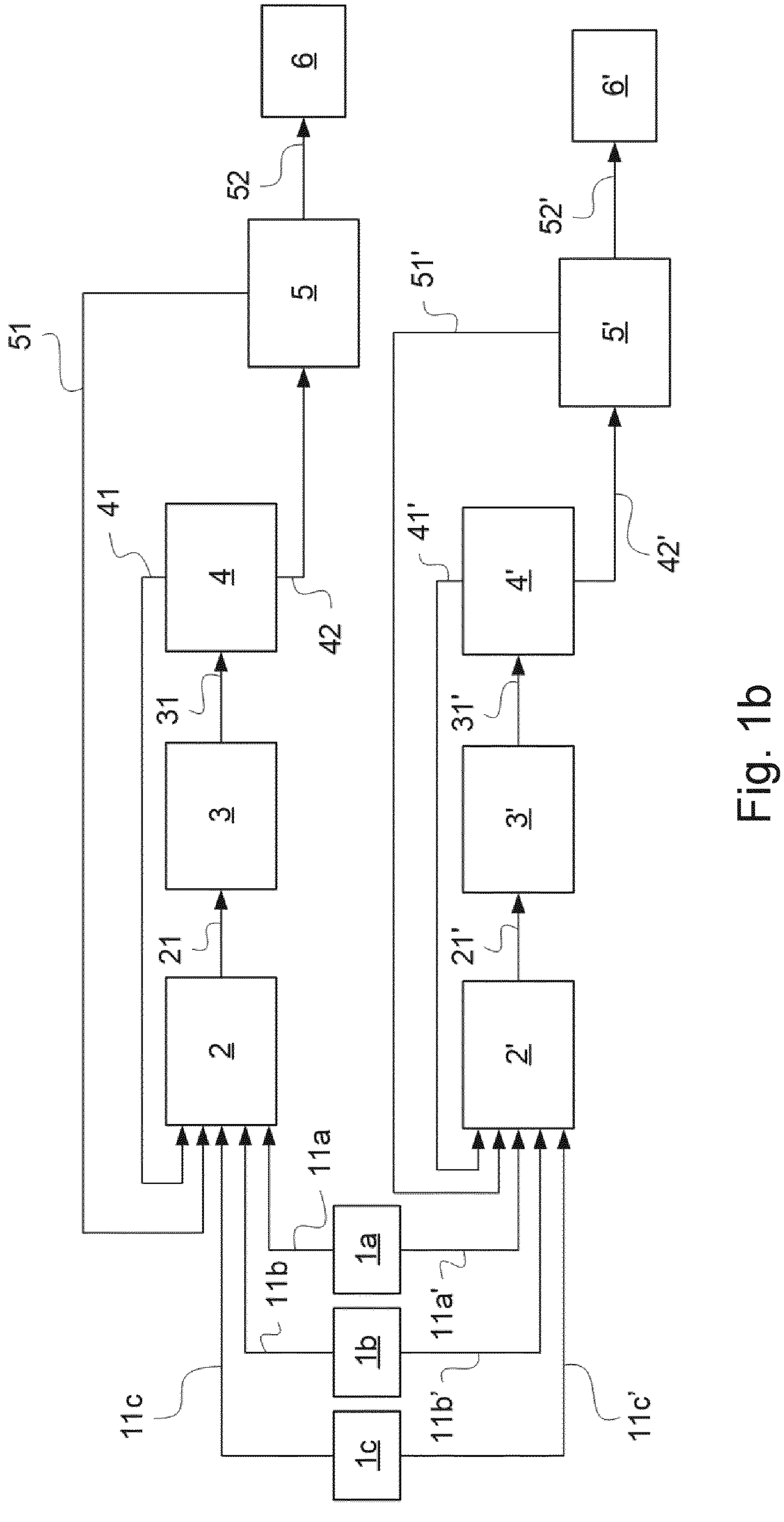
FIG. 1*b* is a schematic drawing of a polymerization process according to an embodiment of the disclosure.

According to an embodiment of the disclosure, the second olefin monomer is obtained from a second olefin monomer source 1*b*', for example via line 11*b*. This embodiment is illustrated in FIG. 1*a*. In this embodiment, the second olefin monomer may be the same as the first olefin monomer or different from the first olefin monomer. According to an alternative embodiment of the disclosure, the second olefin monomer is obtained from the first olefin monomer source 1*b*, for example via line 11*b*'. This embodiment is illustrated in FIG. 1*b*. In this embodiment, the second olefin monomer is the same as the first olefin monomer. For the sake of clarity, the second olefin monomer source 1*b*' is not visible in FIGS. 2 and 3.

According to an embodiment of the disclosure, the second comonomer is obtained from a second comonomer source 1*c*', for example via line 11*c*'. This embodiment is illustrated in FIG. 1*a*. In this embodiment, the second comonomer may be the same as the first comonomer or different from the first comonomer. According to an alternative embodiment of the disclosure, the second comonomer is obtained from the first comonomer source 1*c*, for example via line 11*c*'. This embodiment is illustrated in FIG. 1*b*. In this embodiment, the second comonomer is the same as the first comonomer. For the sake of clarity, the second comonomer source 1*c*' is not visible in FIGS. 2 and 3.

The feed of second olefin monomer from the second olefin monomer source 1*b*', the feed of second comonomer from the second comonomer source 1*c*' and feed of solvent from the solvent source 1*a* are combined to obtain the second hydrocarbon stream. For example, the feed of second olefin monomer, the feed of second comonomer and the feed of solvent are combined in a second feed tank 2'. Alternatively, the feed of second olefin monomer, the feed of second comonomer and the feed of solvent are combined in a location upstream of the second feed tank 2'.

The solvent source 1*a* is comprised in the polymerization arrangement. The solvent source 1*a* is arranged to provide solvent for the first hydrocarbon stream, for example via line 11*a*, and for the second hydrocarbon stream, for example via line 11*a*'. The first hydrocarbon stream comprises first olefin monomer, first comonomer and solvent. The second hydrocarbon stream comprises second olefin monomer, second comonomer and solvent.

The first olefin monomer source 1*b* is comprised in the polymerization arrangement. The first olefin monomer source 1*b* is arranged to provide first olefin monomer for the first hydrocarbon stream. According to an embodiment of the disclosure, the first olefin monomer and the second olefin monomer are the same monomer, and the first olefin monomer source 1*b* is arranged to provide second olefin monomer for the second hydrocarbon stream.

The first comonomer source 1*c* is comprised in the polymerization arrangement. The first comonomer source 1*c* is arranged to provide first comonomer for the first hydrocarbon stream. According to an embodiment of the disclosure, the first comonomer and the second comonomer are the same comonomer, and the first comonomer source 1*c* is arranged to provide second comonomer for the second hydrocarbon stream.

The polymerization process comprises a first combining step, in which the first hydrocarbon stream is combined with hydrocarbons recycled from at least one downstream process step to a first combined hydrocarbon stream. The hydrocarbons recycled from at least one downstream process step may also be accompanied by hydrogen. According to an embodiment of the disclosure, the first combining step is performed in the first feed tank 2. The first feed tank 2 is arranged to store the olefin monomer, the comonomer and the solvent to be fed to a subsequent polymerization step. In other words, the first feed tank 2 is arranged to store both olefin monomer, comonomer and solvent, and recycled olefin monomer, comonomer and solvent as well as optional hydrogen and/or hydrogen obtained from at least one downstream process step.

The first combining means 2 is comprised in the polymerization arrangement. According to an embodiment of the disclosure, the first feed tank 2 acts as the first combining means 2. The first combining means 2 is in fluid connection with the solvent source 1*a*, for example via line 11*a*, the first olefin monomer source 1*b*, for example via line 11*b*, and the first comonomer source 1*c*, for example via line 11*c*. The first combining means 2 is arranged to combine the first hydrocarbon stream with a first stream of recycled hydrocarbons to the first combined hydrocarbon stream. The first stream of recycled hydrocarbons may also comprise hydrogen. The first stream of recycled hydrocarbons is obtained from separation means downstream of the arrangement.

The polymerization process comprises a second combining step, in which the second hydrocarbon stream is combined with hydrocarbons recycled from at least one downstream process step to a second combined hydrocarbon stream. The hydrocarbons recycled from at least one downstream process step may also be accompanied by hydrogen. According to an embodiment of the disclosure, the second combining step is performed in the second feed tank 2'. The second feed tank 2' is arranged to store the olefin monomer, the comonomer and the solvent to be fed to a subsequent polymerization step. In other words, the second feed tank 2' is arranged to store both olefin monomer, comonomer and solvent, and recycled olefin monomer, comonomer and solvent as well as optional hydrogen and/or hydrogen obtained from at least one downstream process step. The first combining step and the second combining step are performed in parallel. In other words, the first combining step and the second combining step are performed essentially at the same time.

The second combining means 2' is comprised in the polymerization arrangement. According to an embodiment of the disclosure, the second feed tank 2' acts as the second combining means 2'. The second combining means 2' is in fluid connection with the solvent source 1*a*, for example via line 11*a'*. The first combining means 2 and the second combining means 2' are arranged to operate in parallel, i.e. at the same time.

Figure 1C:
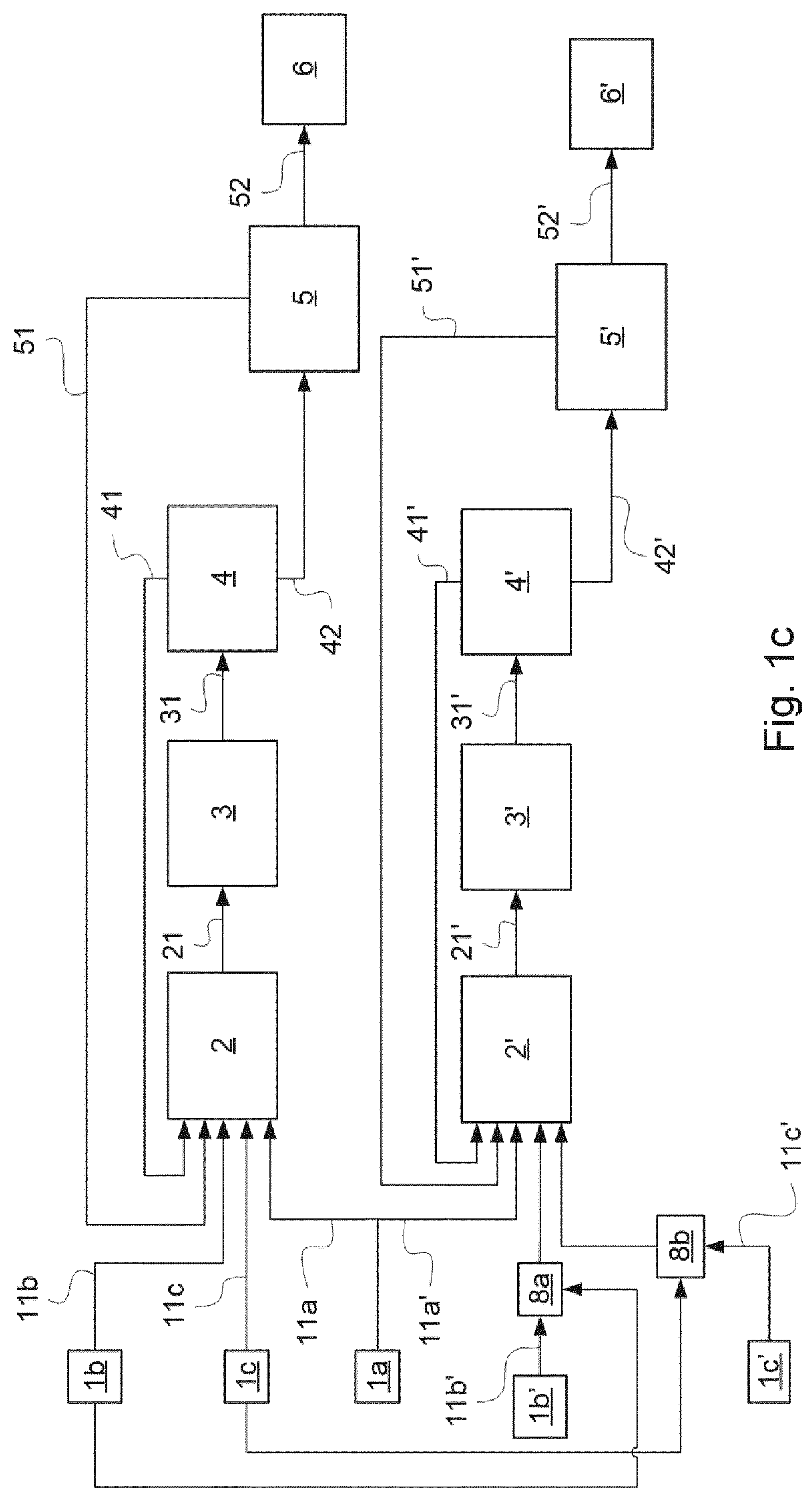
FIG. 1*c* is a schematic drawing of a polymerization process according to an embodiment of the disclosure.

According to an embodiment of the disclosure, the second combining means 2' is in fluid connection with the second olefin monomer source 1*b'*, for example via line 11*b'*. This embodiment is illustrated in FIG. 1*a*. According to an alternative embodiment of the disclosure, the second combining means 2' is in fluid connection with the first olefin monomer source 1*b*, for example via line 11*b'*. This embodiment is illustrated in FIG. 1*b*. According to still a further embodiment of the disclosure, the second combining means 2' is in fluid connection with the first olefin monomer source 1*b* and the second olefin monomer source 1*b'* and the arrangement comprises a first valve means 8*a*, such as a distributor, for selectively opening the passage either a) between the first olefin monomer source 1*b* and the second combining means 2', or b) between the second olefin monomer source 1*b'* and the second combining means 2'. This embodiment is illustrated in FIG. 1*c*. This embodiment allows an easy change from first olefin monomer to second olefin monomer.

According to an embodiment of the disclosure, the second combining means 2' is in fluid connection with the second comonomer source 1*c'*, for example via line 11*c'*. This embodiment is illustrated in FIG. 1*a*. According to an alternative embodiment of the disclosure, the second combining means 2' is in fluid connection with the first comonomer source 1*c*, for example via line 11*c'*. This embodiment is illustrated in FIG. 1*b*. According to still a further embodiment of the disclosure, the second combining means 2' is in fluid connection with the first comonomer source 1*c* and the second comonomer source 1*c'* and the arrangement comprises a second valve means 8*b*, such as a distributor, for selectively opening the passage either a) between the first comonomer source 1*c* and the second combining means 2', or b) between the second comonomer source 1*c'* and the second combining means 2'. This embodiment is illustrated in FIG. 1*c*. This embodiment allows an easy change of the comonomer from first comonomer to second comonomer.

The second combining means 2' is arranged to combine the second hydrocarbon stream with a second stream of recycled hydrocarbons to the second combined hydrocarbon stream. The second stream of recycled hydrocarbons may also comprise hydrogen. The second stream of recycled hydrocarbons is obtained from separation means downstream of the arrangement.

Polymerization

The polymerization process comprises a first polymerization step, in which first olefin monomer and first comonomer are polymerized in the presence of a first polymerization catalyst and optional hydrogen in solvent. According to an embodiment, the first polymerization step is conducted in a first polymerization reactor train 3. The first polymerization reactor train 3 comprises one or more polymerization reactors arranged in series, such as one to four polymerization reactors. According to an embodiment, the first olefin monomer, the first comonomer and the solvent used in the first polymerization step originate from the first combined hydrocarbon stream. The purpose of the first polymerization step is to produce a first solution comprising a first polymer of the first olefin monomer and the first comonomer. For example, the first combined hydrocarbon stream is fed to the first polymerization reactor train 3 via line 21. The first combined hydrocarbon stream can be fed to any polymerization reactor of the first polymerization reactor train 3, such as all polymerization reactors of the first polymerization reactor train 3.

The first polymerization reactor train 3 is comprised in the polymerization arrangement. The first polymerization reactor train 3 is in fluid connection with the first combining means 2, for example via line 21. The first polymerization reactor train 3 is arranged to polymerize first olefin monomer and first comonomer in the presence of a polymerization catalyst in solvent to produce the first solution comprising a first polymer of the first olefin monomer and the first comonomer.

According to an embodiment of the disclosure, polymerization process comprises a first cooling step, in which the first combined hydrocarbon stream is cooled between the first combining step and the first polymerization step. Correspondingly, the polymerization arrangement may comprise a first cooling means (not shown in the figures) arranged between the first feed tank 2 and the first polymerization reactor train 3 for cooling the first combined hydrocarbon stream. For example, the first cooling means comprises a heat exchanger.

The polymerization process comprises a second polymerization step, in which second olefin monomer and second comonomer are polymerized in the presence of a second polymerization catalyst in solvent. According to an embodiment, the second polymerization step is conducted in a second polymerization reactor train 3'. The second polymerization reactor train 3' comprises one or more polymerization reactors arranged in series, such as one to four polymerization reactors. According to an embodiment, the second olefin monomer, the second comonomer and the solvent used in the second polymerization step originate from the second combined hydrocarbon stream. The purpose of the second polymerization step is to produce a second solution comprising a second polymer of the second olefin monomer and the second comonomer. For example, the second combined hydrocarbon stream is fed to the second polymerization reactor train 3' via line 21'. The second combined hydrocarbon stream can be fed to any polymerization reactor of the second polymerization reactor train 3', such as all polymerization reactors of the second polymerization reactor train 3'. The first polymerization step and the second polymerization step are performed in parallel. In other words, the first polymerization step and the second polymerization step are performed essentially at the same time.

The second polymerization reactor train 3' is comprised in the polymerization arrangement. The second polymerization reactor train 3' is in fluid connection with the second combining means 2', for example via line 21'. The second polymerization reactor train 3' is arranged to polymerize olefin monomer and comonomer in the presence of a polymerization catalyst in solvent to produce the second solution comprising a second polymer of the olefin monomer and the comonomer. The first reactor train 3 and the second reactor train 3' are arranged to operate in parallel, i.e. at the same time.

According to an embodiment of the disclosure, polymerization process comprises a second cooling step, in which the second combined hydrocarbon stream is cooled between the second combining step and the second polymerization step. Correspondingly, the polymerization arrangement may comprise a second cooling means (not shown in the figures) arranged between the second feed tank 2' and the second polymerization reactor train 3' for cooling the second combined hydrocarbon stream. For example, the second cooling means comprises a heat exchanger. The first cooling step and the second cooling step are performed in parallel. In other words, the first cooling step and the second cooling step are performed essentially at the same time.

Preferably, the olefin monomer, i.e. the first olefin monomer and/or the second olefin monomer, has 2 to 10 carbon atoms. More preferably, the olefin monomer is selected from the group consisting of ethylene, propylene and 1-butene. Especially preferably, the olefin monomer is ethylene. According to an embodiment of the disclosure, the first olefin monomer is the same as the second olefin monomer. In this embodiment, the second olefin monomer may also be obtained from the first olefin monomer source 1*b*. An advantage of using the process and the arrangement for producing two different types of polyethylene is that a better homogeneity of the polyethylene is obtained. According to an alternative embodiment, the first olefin monomer is different from the second olefin monomer. In this alternative embodiment, the second olefin monomer is obtained from the second olefin monomer source 1*b'*.

According to an embodiment of the disclosure, the comonomer, i.e. the first comonomer and/or the second comonomer, is selected from the group consisting of alpha-olefins different from the corresponding olefin monomer; polyenes, such as non-conjugated alpha-omega-dienes, having from 3 to 10 carbon atoms, cyclic olefins having from 6 to 20 carbon atoms and cyclic polyenes having from 6 to 20 carbon atoms. Preferably, the comonomer is selected from the group of alpha-olefins different from the corresponding olefin monomer having from 2 to 10 carbon atoms, such as 1-butene, 1-hexene and 1-octene when the corresponding olefin monomer is ethylene; and ethylene, 1-butene and 1-hexene when the corresponding olefin monomer is propylene. 1-hexene and 1-octene are typically used as comonomers in solution polymerization. According to an embodiment of the disclosure, the first comonomer is the same as the second comonomer. In this embodiment, the second comonomer may also be obtained from the first comonomer source 1*c*. According to an alternative embodiment, the first comonomer differs from the second comonomer. In this alternative embodiment, the second comonomer is obtained from the second comonomer source 1*c'*. The first polymerization step and/or the second polymerization step may also be conducted using more than one comonomers.

The polymerization catalyst, i.e. the first polymerization catalyst and/or the second polymerization catalyst, may be any catalyst known in the art, which is capable of polymerizing the monomer and the comonomer. Thus, the polymerization catalyst may be a Ziegler-Natta catalyst as disclosed in EP 280352 A, EP 280353 A and EP 286148 A, it may be a metallocene catalyst as disclosed in WO 1993025590 A, U.S. Pat. No. 5,001,205 A, WO 1987003604 A, U.S. Pat. No. 5,001,244 A, WO 2018/178151 A1, WO 2018/178152 A1, WO 2018/108917 A1, and WO 2018/108918 A1, or it may be a combination of these. In addition, other suitable catalysts, such as late transition metal catalysts, can be used.

According to an embodiment of the disclosure, the polymerization catalyst is comprised in a polymerization catalyst system.

According to an embodiment of the disclosure, the first polymerization catalyst is the same as the second polymerization catalyst. According to an alternative embodiment of the disclosure, the polymerization catalyst used in the first polymerization step differs from the polymerization catalyst used in the second polymerization step. The first polymerization step and/or the second polymerization step may also be conducted using more than one catalyst. According to an embodiment of the disclosure the first polymerization step and/or the second polymerization step is conducted in the presence of more than one polymerization catalyst.

According to an embodiment of the disclosure the first polymerization step and/or the second polymerization step is conducted in the presence of one or more chain transfer agent(s). The one or more chain transfer agent(s) may be used for controlling the molecular weight of the polymer, as it is known in the art. A suitable chain transfer agent is, for instance, hydrogen.

The solvent may be any suitable straight-chain or branched alkyl having from 3 to 20 carbon atoms, a cyclic alkyl, optionally having alkyl substituents, having from 5 to 20 carbon atoms, or an aryl, optionally having alkyl substituents, having from 6 to 20 carbon atoms, or a mixture of two or more of the above-listed compounds. The solvent must be inert towards the polymerization catalyst and the monomers. Further, it should be stable in the polymerization conditions. It further must be able to dissolve the monomer, the comonomer, the optional chain transfer agent and the polymer in the polymerization conditions. The solvent used in the first polymerization step is the same as the solvent used in the second polymerization step.

As a result, during the polymerization steps, each polymerization system is in its dense fluid state and comprises olefin monomers, comonomer, solvent, any chain transfer agent present and the polymer product.

The temperature in each polymerization reactor of the first polymerization reactor train 3 and in the second polymerization reactor train 3' is such that the polymer formed in the polymerization reaction is completely dissolved in the reaction mixture comprising the solvent, the comonomer, the eventual chain transfer agent and the polymer. The temperature is suitably greater than the melting temperature of the polymer. Thus, when the polymer is a homo- or copolymer of ethylene, the temperature is suitably from 120° C. to 220° C., such as from 150° C. to 200° C., depending on the content of comonomer units in the polymer. When the polymer is a homo- or copolymer of propylene, the temperature is suitably from 165° C. to 250° C., such as from 170° C. to 220° C., depending on the content of comonomer units in the polymer.

The pressure in each polymerization reactor of the first polymerization reactor train 3 and the second polymerization reactor train 3' depends on the temperature, on one hand, and the type and the amount of the comonomer, on the other hand. The pressure is suitably from 50 to 300 bar, preferably from 50 to 250 bar and more preferably from 70 to 200 bar.

The temperature and the pressure must be such that the reaction mixture forms a single phase.

The residence time is short, typically less than 10 minutes.

The process is operated continuously. Thereby streams of monomer, comonomer, catalyst and solvent, and, when present, stream of chain transfer agent are continuously passed to the first polymerization reactor train 3 and the second polymerization reactor train 3'.

The polymerization process comprises a first withdrawing step, in which a first exhaust stream of the first solution, i.e. a product stream comprising unreacted first olefin monomer, unreacted first comonomer, dissolved first polymer and eventual unreacted chain transfer agent, is withdrawn. Preferably, the exhaust stream of the first solution is withdrawn from the first polymerization reactor train 3 either continuously or intermittently, preferably continuously. For example, the first exhaust stream is withdrawn from the first polymerization reactor train 3 via line 31.

The polymerization process comprises a second withdrawing step, in which a second exhaust stream of the second solution, i.e. a product stream comprising unreacted second olefin monomer, unreacted second comonomer, dissolved second polymer and eventual unreacted chain transfer agent, is withdrawn. Preferably, the exhaust stream of the second solution is withdrawn from the second polymerization reactor train 3' either continuously or intermittently, preferably continuously. For example, the second exhaust stream is withdrawn from the second polymerization reactor train 3' via line 31'. The first withdrawing step and the second withdrawing step are performed in parallel. In other words, the first withdrawing step and the second withdrawing step are performed essentially at the same time.

Primary Separation

The polymerization process comprises a first primary separation step, in which the first exhaust stream is separated to a first primary hydrocarbon stream, i.e. an overhead stream, and a first concentrated solution stream, i.e. a bottom stream. Preferably, the first primary separation step is conducted using a separator, in which a liquid phase comprising the first polymer and a vapour phase coexist.

The polymerization process comprises a second primary separation step, in which the second exhaust stream is separated to a second primary hydrocarbon stream, i.e. an overhead stream, and a second concentrated solution stream, i.e. a bottom stream. Preferably, the second primary separation step is conducted using a separator, in which a liquid phase comprising the second polymer and a vapour phase coexist. The first primary separation step and the second primary separation step are performed in parallel. In other words, the first primary separation step and the second primary separation step are performed essentially at the same time.

Each one of the first primary concentrated solution stream and the second concentrated solution stream contains polymer dissolved in solvent and unreacted comonomer. They may also contain residual monomer, which remains in the solution. Typically, the polymer concentration in the concentrated solution stream, i.e. the first concentrated solution stream and/or the second concentrated solution stream, is from 40% to 99% by weight, preferably from 50 to 90% by weight and most preferably from 60 to 80% by weight, based on the total weight content of the corresponding concentrated solution stream, i.e. the first concentrated solution stream or the second concentrated solution stream. The concentrated solution stream is then typically in liquid phase.

Each one of the first primary hydrocarbon stream and the second primary hydrocarbon stream contains unreacted monomer and other volatile compounds, such as hydrogen.

Each one of the first primary hydrocarbon stream and the second primary hydrocarbon stream also contains some of the solvent and comonomer. The first primary hydrocarbon stream and/or the second primary hydrocarbon stream can optionally comprise a small amount of liquid droplets. The amount of such droplets is typically not more than 40% by volume, preferably not more than 30% by volume and especially preferably not more than 20% by volume.

The first primary separation step and the second primary separation step may be conducted in any process step where volatile compounds can be withdrawn from the solution. Typically, such a process step involves pressure reduction and preferably heating of the solution. One typical example of such a process step is flashing. For instance, the stream of the solution is heated and then passed along a pipe to a receiving vessel, i.e. a flash vessel, which is operated at a pressure, which is substantially lower than the pressure in the last polymerisation reactor of the polymerization reactor train, i.e. the first polymerization reactor train 3 or the second polymerization reactor train 3'. Thereby a part of the fluid contained in the solution evaporates and is withdrawn as the first primary hydrocarbon stream or as the second primary hydrocarbon stream, i.e. the vapour stream. The part remaining in the solution with the polymer forms the concentrated solution stream.

Preferably, the stream of the solution is heated so that a heated solution stream is produced. Typically, the temperature of the heated stream is from 200° C. to 300° C., preferably from 210° C. to 270° C. and more preferably from 210° C. to 250° C. Preferably, the temperature of heated stream is from 10° C. to 120° C., more preferably from 20° C. to 100° C. greater than the temperature of the solution in the last polymerization reactor in the polymerisation reactor train.

The pressure of the stream of the solution is reduced so that the pressure in the receiving vessel is within the range of from 1 to 15 bar, preferably from 2 to 12 bar and more preferably from 5 to 10 bar. The pressure is preferably reduced so that it is at least from about 40 bar to about 295 bar lower than the pressure in the last polymerisation reactor of the polymerization reactor train.

Flashing in Primary Separation

According to an embodiment of the disclosure, each one of the first primary separation step and the second primary separation step is a flashing step. Thereby a liquid phase and a vapour phase are present in each one of the first primary separation step and the second primary separation step. In the first primary separation step, the flashing step is conducted in a first primary separation device 4, which is preferably a flash vessel. The first exhaust stream is led to the first primary separation device 4 via line 31. In the second primary separation step, the flashing step is conducted in a second primary separation device 4', which is preferably a flash vessel. The second exhaust stream is led to the second primary separation device 4' via line 31'.

The first primary separation device 4 is comprised in the polymerization arrangement. The first primary separation device 4 is in fluid connection with the first polymerization reactor train 3, for example via line 31. The first primary separation device 4 is arranged to separate the first exhaust stream of the first solution withdrawn from the first polymerization reactor train 4 to the first primary hydrocarbon stream and the first concentrated solution stream.

The second primary separation device 4' is comprised in the polymerization arrangement. The second primary separation device 4' is in fluid connection with the second polymerization reactor train 3', for example via line 31'. The second primary separation device 4' is arranged to separate the second exhaust stream of the second solution withdrawn from the second polymerization reactor train 4' to the second primary hydrocarbon stream and the second concentrated solution stream. The first primary separation device 4 and the second primary separation device 4' are arranged to operate in parallel, i.e. at the same time.

Preferably, the flash vessel used as the first primary separation device 4 and the flash vessel used as the second primary separation device 4' are essentially identical. The flash vessel, i.e. each one of the flash vessels, is a vertical vessel preferably having a generally cylindrical shape. Thereby the flash vessel has a section, which has approximately a circular cross-section. Preferably, the flash vessel has a cylindrical section, which has a shape of a circular cylinder. In addition to the cylindrical section, the flash vessel may have additional sections, such as a bottom section, which may be conical, and a top section, which may be hemispherical. Alternatively, the flash vessel may also have a generally conical shape.

The temperature in the flash vessel is typically from 130 to 250° C. The temperature should be sufficiently high to keep the viscosity of the solution at a suitable level but less than the temperature where the polymer is degraded. The pressure in the flash vessel is typically from 15 bar to atmospheric, or even less than atmospheric.

The exhaust stream, i.e. the first exhaust stream or the second exhaust stream, enters the flash vessel at the top. The exhaust stream travels downwards in the flash vessel while the gases, which evaporate from the exhaust stream, travel upwards. According to this preferred embodiment, the exhaust stream forms a thin film, which falls downwards in the flash vessel. This facilitates the removal of hydrocarbons from the exhaust stream. The gases are typically withdrawn from the top of the flash vessel while the remaining solution is withdrawn from the bottom. This kind of process is disclosed for example in WO 2018/054805 A1 and WO 2016/156185 A1.

According to an especially preferred embodiment, the exhaust stream is sprayed in the flash vessel. The spraying can be done by using one or more suitable nozzles, which disperse the exhaust stream into droplets. Such nozzles are well known in the industry and include air atomising nozzles, flat fan nozzles, hollow cone nozzles and full cone nozzles. Preferably, the nozzles break the stream into droplets having the size of not more than about 1 mm.

The nozzle forms a stream of droplets in the flash vessel. The stream of droplets then coagulates within the flash vessel and forms a falling film having a relatively high surface area. This enhances the mass transfer of the volatile components from the solution.

As described above, the flash vessel can have a vertical generally cylindrical shape. Then the stream of droplets is directed tangentially with the wall of the flash vessel by a suitable position of the nozzle. Thus, the nozzle is suitably located relatively near to the wall so that its outlet is directed tangentially with the wall. When the stream of the droplets exits the nozzle, it moves in the direction of the wall forming a downwards falling film. It is also possible that the flash vessel has a vertical, generally conical, shape. In such embodiment, it is possible to direct the stream of the droplets tangentially with the wall of the flash vessel, as described above. However, it is also possible direct the droplets axially towards the wall of the flash vessel. The nozzle or the nozzles are then arranged eccentrically within the flash vessel. In both arrangements, the polymer solution forms a falling film within the flash vessel.

The polymer content in each one of the first concentrated solution stream and the second concentrated solution stream withdrawn from the flashing stages is typically from 35 to 99% by weight. In other words, each one of the first concentrated solution stream and the second concentrated solution stream withdrawn from the flashing stages contains from 1 to 65% by weight of residual hydrocarbons.

When viewed from a different angle, the first primary hydrocarbon stream withdrawn from the first flash vessel is from 35 to 80% by weight from the total material streams withdrawn from the first flash vessel. Correspondingly, the second primary hydrocarbon stream withdrawn from the second flash vessel is from 35 to 80% by weight from the total material streams withdrawn from the second flash vessel. Each one of the first primary hydrocarbon stream and the second primary hydrocarbon stream comprise unreacted monomer, unreacted comonomer, solvent and entrained polymer.

By using the flash as described above, it is possible to achieve a high separation efficiency. For instance, separation efficiency for hydrocarbons containing six carbon atoms is at least 75% and preferably at least 80%. Additionally still, separation efficiency for hydrocarbons containing eight carbon atoms is at least 60% and preferably at least 65%. The separation efficiency is defined as the mass flow of the component withdrawn in the hydrocarbon stream divided by the (theoretical) mass flow rate of the component in the hydrocarbon stream in equilibrium conditions.

The first primary hydrocarbon stream is withdrawn from the first primary separation device 4 via line 41. The first concentrated solution stream is withdrawn from the first primary separation device 4 via line 42.

The second primary hydrocarbon stream is withdrawn from the second primary separation device 4' via line 41'. The second concentrated solution stream is withdrawn from the second primary separation device 4' via line 42'.

Primary Recycling

The primary recycling constitutes a short recycle of the polymerization process and the polymerization arrangement.

The polymerization process comprises a first primary recycling step, in which the first primary hydrocarbon stream is recycled to the first combining step. Recycling of the first primary hydrocarbon stream is performed using a first primary recycling means, for example comprising line 41.

The first primary recycling means is comprised in the polymerization arrangement. The first primary recycling means is in fluid connection with the first primary separation device 4 and the first combining means 2 for recycling the first primary hydrocarbon stream to the first combining means 2.

The polymerization process comprises a second primary recycling step, in which the second primary hydrocarbon stream is recycled to the second combining step. Recycling of the second primary hydrocarbon stream is performed using a second primary recycling means, for example comprising line 41'. The first primary recycling step and the second primary recycling step are performed in parallel. In other words, the first primary recycling step and the second primary recycling step are performed essentially at the same time.

The second primary recycling means is comprised in the polymerization arrangement. The second primary recycling means is in fluid connection with the second primary separation device 4' and the second combining means 2' for recycling the second primary hydrocarbon stream to the second combining means 2'. The first primary recycling means and the second primary recycling means are arranged to operate in parallel, i.e. at the same time.

According to an embodiment, the primary recycling step, i.e. the first primary recycling step and/or the second primary recycling step, does not comprise fractionating the primary hydrocarbon stream. Correspondingly, the primary recycling means, i.e. the first primary recycling means or the second primary recycling means, does not include a fractionation device.

Secondary Separation

The polymerization process comprises a first secondary separation step, in which the first concentrated solution stream is separated to a first secondary hydrocarbon stream, i.e. an overhead stream, and a first polymer product stream, i.e. a bottom stream. Preferably, the first secondary separation step is conducted using a separator, in which a liquid phase comprising the polymer and a vapour phase coexist. The purpose of the first secondary separation step is to recover further volatile compounds from the first concentrated solution stream. This includes a major part of the solvent and comonomer.

The polymerization process comprises a second secondary separation step, in which the second concentrated solution stream is separated to a second secondary hydrocarbon stream, i.e. an overhead stream, and a second polymer product stream, i.e. a bottom stream. Preferably, the second secondary separation step is conducted using a separator, in which a liquid phase comprising the polymer and a vapour phase coexist. The purpose of the second secondary separation step is to recover further volatile compounds from the second concentrated solution stream. This includes a major part of the solvent and comonomer. The first secondary separation step and the second secondary separation step are performed in parallel. In other words, the first secondary separation step and the second secondary separation step are performed essentially at the same time.

The secondary separation, i.e. the first secondary separation step and the second secondary separation step, may be conducted in any process step where volatile compounds can be withdrawn from the solution. Typically, such a process step involves pressure reduction and preferably heating of the solution. The secondary separation may be conducted in a similar way as the primary separation, i.e. the first primary separation step and the second primary separation step, such as by flashing.

Preferably, the concentrated solution stream, i.e. the first concentrated solution stream and/or the second concentrated solution stream, is heated so that a heated concentrated solution stream is produced. Typically, the temperature of the heated concentrated solution stream is from 200° C. to 300° C., preferably from 210° C. to 280° C. and more preferably from 240° C. to 260° C. Preferably, the temperature of heated concentrated solution stream is from 10° C. to 120° C., more preferably from 20° C. to 100° C. greater than the temperature of the concentrated solution in the corresponding primary separation step, i.e. the first primary separation step or the second primary separation step.

The pressure of concentrated solution stream is reduced so that the pressure in the receiving vessel is within the range of from 0.5 to 10 bar, preferably from 0.8 to 5 bar and more preferably from 0-9 to 2 bar. The pressure is preferably reduced so that it is at least from about 10 bar to about 24 bar lower than the pressure in the corresponding primary separation step, i.e. the first primary separation step or the second primary separation step.

Flashing in Secondary Separation

According to an embodiment of the disclosure, each one of the first secondary separation step and the second secondary separation step is a flashing step. Thereby a liquid phase and a vapour phase are present in each one of the first secondary separation step and the second secondary separation step.

According to an embodiment of the disclosure, in the first secondary separation step, the flashing step is conducted in a first secondary separation device 5, which is preferably a flash vessel. According to an alternative embodiment, in the first secondary separation step, the flashing step is conducted in a plurality, such as 2 to 6, of first secondary separation devices, which are preferably flash vessels arranged in series so that the overhead streams from each first secondary separation device are recovered and combined as the first secondary hydrocarbon stream and the bottom stream from each first secondary separation device is led to the subsequent first secondary separation device. The bottom stream from the final first secondary separation device is recovered as the first polymer product stream.

The first concentrated solution stream is led to the first secondary separation device 5 or the first one of the plurality of the first secondary separation devices via line 42.

In the second secondary separation step, the flashing step is conducted in a second secondary separation device 5', which is preferably a flash vessel. According to an alternative embodiment, in the second secondary separation step, the flashing step is conducted in a plurality, such as 2 to 6, of second secondary separation devices, which are preferably flash vessels arranged in series so that the overhead streams from each second secondary separation device are recovered and combined as the second secondary hydrocarbon stream and the bottom stream from each second secondary separation device is led to the subsequent second secondary separation device. The bottom stream from the final second secondary separation device is recovered as the second polymer product stream.

The second concentrated solution stream is led to the second secondary separation device 5' or the first one of the plurality of the second secondary separation devices via line 42'.

The first secondary separation device 5 is comprised in the polymerization arrangement. The first secondary separation device 5 is in fluid connection with the first primary separation device 4, for example via line 42. The first secondary separation device 5 is arranged to separate the first concentrated solution stream to the first secondary hydrocarbon stream and the first polymer product stream.

The second secondary separation device 5' is comprised in the polymerization arrangement. The second secondary separation device 5' is in fluid connection with the second primary separation device 4', for example via line 42'. The second secondary separation device 5' is arranged to separate the second concentrated solution stream to the second secondary hydrocarbon stream and the second polymer product stream. The first secondary separation device 5 and the second secondary separation device 5' are arranged to operate in parallel, i.e. at the same time.

The first secondary hydrocarbon stream is withdrawn from the first secondary separation device 5 via line 51. The first polymer product stream is withdrawn from the first secondary separation device 5 via line 52. For example, the first polymer product stream is led via line 52 to the first extruder 6.

The second secondary hydrocarbon stream is withdrawn from the second secondary separation device 5' via line 51'. The second polymer product stream is withdrawn from the second secondary separation device 5' via line 52'. For example, the second polymer product stream is led via line 52' to the second extruder 6'.

Secondary Recycling

The secondary recycling constitutes a long recycle of the polymerization process and the polymerization arrangement.

The polymerization process comprises a first secondary recycling step, in which the first secondary hydrocarbon stream is recycled to the first combining step. Recycling of the first secondary hydrocarbon stream is performed using a first secondary recycling means, for example comprising line 51.

The first secondary recycling means is comprised in the polymerization arrangement. The first secondary recycling means is in fluid connection with the first secondary separation device 5 and the first combining means 2 for recycling the first secondary hydrocarbon stream to the first combining means 2.

The polymerization process comprises a second secondary recycling step, in which the second secondary hydrocarbon stream is recycled to the second combining step. Recycling of the second secondary hydrocarbon stream is performed using a second secondary recycling means, for example comprising line 51'. The first secondary recycling step and the second secondary recycling step are performed in parallel. In other words, the first secondary recycling step and the second secondary recycling step are performed essentially at the same time.

The second secondary recycling means is comprised in the polymerization arrangement. The second secondary recycling means is in fluid connection with the second secondary separation device 5' and the second combining means 2' for recycling the second secondary hydrocarbon stream to the second combining means 2'.

According to an embodiment of the disclosure, the secondary recycling step, i.e. the first secondary recycling step and/or the second secondary recycling step, comprises fractionating the secondary hydrocarbon stream, i.e. the first secondary hydrocarbon stream and/or the second secondary hydrocarbon stream. Correspondingly, the secondary recycling means, i.e. the first secondary recycling means and/or the second secondary recycling means, comprises a fractionation device.

Combining of Secondary Hydrocarbon Streams

Figure 2:
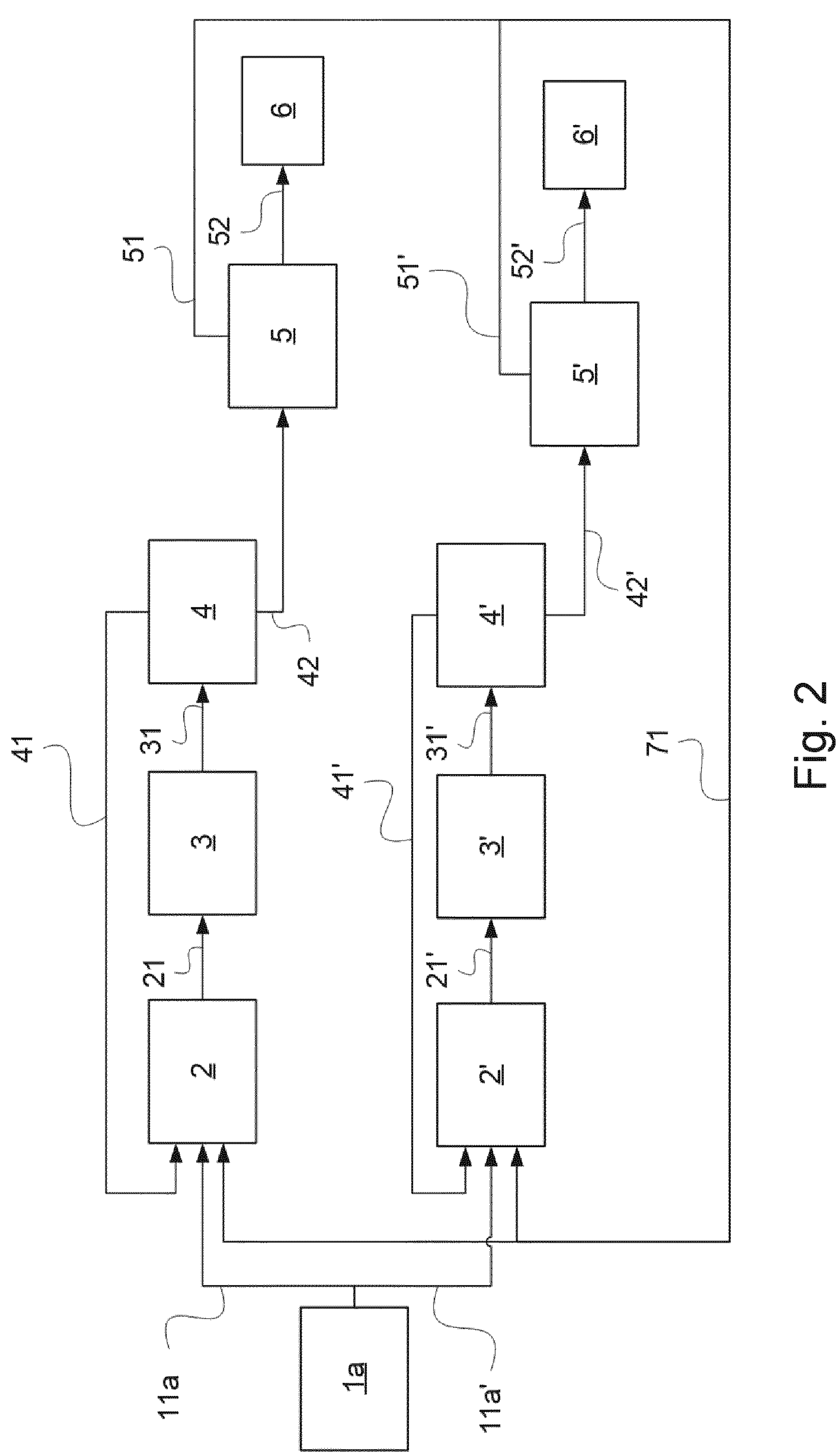
FIG. 2 is a schematic drawing of a polymerization process according to an embodiment of the disclosure.

According to an embodiment of the disclosure, the polymerization process comprises combining the first secondary hydrocarbon stream and the second secondary hydrocarbon stream to a third combined hydrocarbon stream, and recycling the third combined hydrocarbon stream to the first combining step and the second combining step. In other words, the first secondary recycling means and the second secondary recycling means are arranged to combine the first secondary hydrocarbon stream and the second secondary hydrocarbon stream to the third combined hydrocarbon stream and to recycle the third combined hydrocarbon stream to the first combining means 2 and to the second combining means 2'. This embodiment is illustrated in FIG. 2. When the first secondary hydrocarbon stream led via line 51 and the second secondary hydrocarbon stream led via line 51' are combined, the third combined hydrocarbon stream is led via line 71.

Tertiary Separation

According to an embodiment of the disclosure, the polymerization process comprises a tertiary separation step, in which the third combined hydrocarbon stream is separated to a light hydrocarbon stream, i.e. an overhead stream, for example a vapour hydrocarbon stream, and a heavy hydrocarbon stream, i.e. a bottom stream, for example a liquid hydrocarbon stream. The light hydrocarbon stream comprises lighter hydrocarbons, such as olefin monomer, than the heavy hydrocarbon stream, which may comprise comonomer, for example.

The tertiary separation is normally comprised in a recovery unit where different hydrocarbons are separated and returned to the reactor(s). The aim is to separate hydrocarbons from each other for achieving efficient recycling of hydrocarbons.

Figure 3:
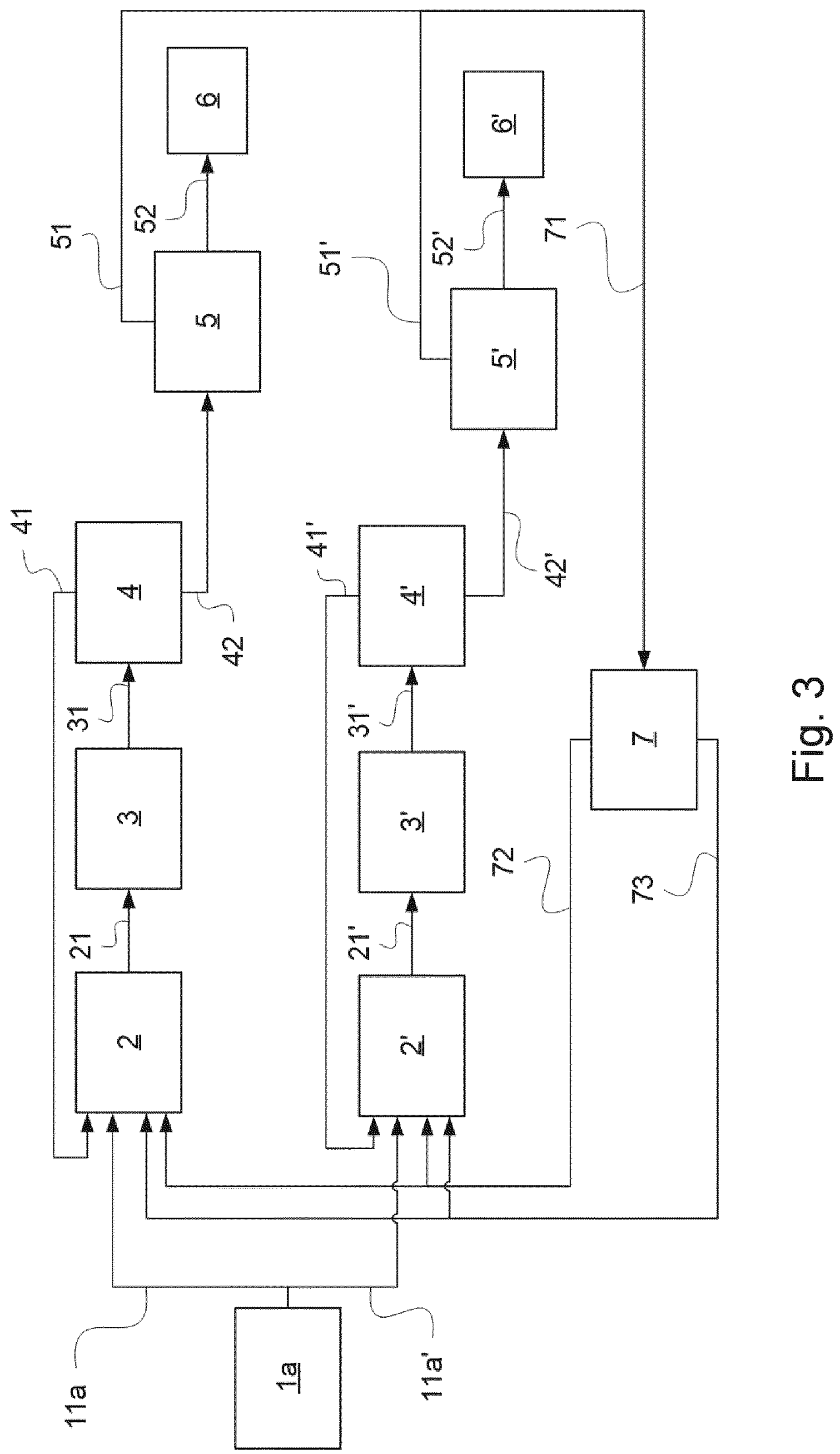
FIG. 3 is a schematic drawing of a polymerization process according to an embodiment of the disclosure.

The tertiary separation step is conducted in a tertiary separation device 7. The tertiary separation device 7 is comprised in the first secondary recycling means and the second secondary recycling means. The tertiary separation device 7 is in fluid connection with first secondary separation device 5 and the second secondary separation device 5'. The tertiary separation device 7 is arranged to separate the third combined hydrocarbon stream to the light hydrocarbon stream and the heavy hydrocarbon stream. For example, the tertiary separation step a distillation step. In other words, the tertiary separation device 7 may be a distillation column. Alternatively, the tertiary separation step is a condensation step, in which the third combined hydrocarbon stream separated by condensation. The third combined hydrocarbon stream is led to the tertiary separation device 7 via line 71. This embodiment is illustrated in FIG. 3.

The light hydrocarbon stream is recycled to the first combining step and/or to the second combining step. The heavy hydrocarbon stream is recycled to the first combining step and/or to the second combining step.

The light hydrocarbon stream is withdrawn from the tertiary separation device 7 via line 72. According to an embodiment, the light hydrocarbon stream is further divided into a first part of the light hydrocarbon stream and a second part of the light hydrocarbon stream. The ratio of the first part of the light hydrocarbon stream to the second part of the light hydrocarbon stream may be from 1:99 to 99:1. The first part of the light hydrocarbon stream is recycled to the first combining step. A second part of the light hydrocarbon stream is recycled to the second combining step. According to an alternative embodiment, the light hydrocarbon stream is recycled to the first combining step or the second combining step in full. An advantage of this embodiment is that it allows recycling light hydrocarbon components, such as olefin monomer, only to one reactor train, if different polymers are produced in different reactor trains.

The heavy hydrocarbon stream is withdrawn from the tertiary separation device 7 via line 73. According to an embodiment, the heavy hydrocarbon stream is further divided into a first part of the heavy hydrocarbon stream and a second heavy hydrocarbon stream. The ratio of the first part of the heavy hydrocarbon stream to the second part of the heavy hydrocarbon stream may be from 1:99 to 99:1. The first part of the heavy hydrocarbon stream is recycled to the first combining step. The second part of heavy hydrocarbon stream is recycled to the second combining step. According to an alternative embodiment, the heavy hydrocarbon stream is recycled to the first combining step or the second combining step in full. An advantage of this embodiment is that it allows recycling heavy hydrocarbon components, such as comonomer, only to one reactor train, if different polymers are produced in different reactor trains.

Further Processing

From the first secondary separation step, the first polymer product stream is lead to further processing, such as to a first extruding step conducted in a first extruder 6. Correspondingly, from the second secondary separation step, the second polymer product stream is lead to further processing, such as to a second extruding step conducted in a second extruder 6'. Preferably, the first extruding step is separate from the second extruding step.

The invention claimed is:

1. A continuous polymerization process, comprising providing a first hydrocarbon stream comprising first olefin monomer, first comonomer and solvent in a first providing step, wherein solvent is obtained from a solvent source;

combining the first hydrocarbon stream with hydrocarbons recycled from at least one downstream process step to a first combined hydrocarbon stream in a first combining step;

continuously polymerizing the first olefin monomer and the first comonomer in the presence of a first polymerization catalyst in a first polymerization step in the solvent to produce a first solution comprising a first polymer of the first olefin monomer and the first comonomer;

withdrawing a first exhaust stream of the first solution in a first withdrawing step;

separating the first exhaust stream to a first primary hydrocarbon stream and a first concentrated solution stream in a first primary separation step;

recycling the first primary hydrocarbon stream to the first combining step in a first primary recycling step;

separating the first concentrated solution stream to a first secondary hydrocarbon stream and a first polymer product stream in a first secondary separation step;

recycling the first secondary hydrocarbon stream to the first combining step in a first secondary recycling step;

providing a second hydrocarbon stream comprising second olefin monomer, second comonomer and solvent in a second providing step, wherein solvent is obtained from the solvent source;

combining the second hydrocarbon stream with hydrocarbons recycled from at least one downstream process step to a second combined hydrocarbon stream in a second combining step;

continuously polymerizing the second olefin monomer and the second comonomer in the presence of a second polymerization catalyst in a second polymerization step in the solvent to produce a second solution comprising a second polymer of the second olefin monomer and the second comonomer;

withdrawing a second exhaust stream of the second solution in a second withdrawing step;

separating the second exhaust stream to a second primary hydrocarbon stream and a second concentrated solution stream in a second primary separation step;

recycling the second primary hydrocarbon stream to the second combining step in a second primary recycling step;

separating the second concentrated solution stream to a second secondary hydrocarbon stream and a second polymer product stream in a second secondary separation step; and recycling the second secondary hydrocarbon stream to the second combining step in a second secondary recycling step, wherein the first providing step and the second providing step are performed in parallel;

the first combining step and the second combining step are performed in parallel;

the first polymerization step and the second polymerization step are performed in parallel;

the first withdrawing step and the second withdrawing step are performed in parallel;

the first primary separation step and the second primary separation step are performed in parallel;

the first primary recycling step and the second primary recycling step are performed in parallel;

the first secondary separation step and the second secondary separation step are performed in parallel; and the first secondary recycling step and the second secondary recycling step are performed in parallel.

2. A polymerization process according to claim 1, wherein the second olefin monomer is the same as the first olefin monomer.

3. A polymerization process according to claim 1, wherein the second comonomer is the same as the first comonomer.

4. A polymerization process according to claim 1, comprising combining the first secondary hydrocarbon stream and the second secondary hydrocarbon stream to a third combined hydrocarbon stream and recycling the third combined hydrocarbon stream to the first combining step and/or to the second combining step.

5. A polymerization process according to claim 4, wherein the third combined hydrocarbon stream is separated to a light hydrocarbon stream and a heavy hydrocarbon stream in a tertiary separation step;

the light hydrocarbon stream is recycled to the first combining step and/or to the second combining step; and the heavy hydrocarbon stream is recycled to the first combining step and/or to the second combining step.

6. A polymerization arrangement, comprising a solvent source arranged to provide solvent for a first hydrocarbon stream and a second hydrocarbon stream, the first hydrocarbon stream comprising first olefin monomer, first comonomer and solvent, and the second hydrocarbon stream comprising second olefin monomer, second comonomer and solvent;

a first olefin monomer source arranged to provide first olefin monomer for the first hydrocarbon stream;

a first comonomer source arranged to provide first comonomer for the first hydrocarbon stream;

a first combining means in fluid connection with the solvent source, the first olefin monomer source and the first comonomer source, wherein the first combining means is arranged to combine the first hydrocarbon stream with a stream of recycled hydrocarbons to a first combined hydrocarbon stream;

a first polymerization reactor train in fluid connection with the first combining means and arranged to continuously polymerize olefin monomer and comonomer in the presence of a polymerization catalyst in solvent to produce a first solution comprising a first polymer of the olefin monomer and the comonomer;

a first primary separation device in fluid connection with the first polymerization reactor train and arranged to separate a first exhaust stream of the first solution withdrawn from the first polymerization reactor train to a first primary hydrocarbon stream and a first concentrated solution stream;

a first primary recycling means in fluid connection with the first primary separation device and the first combining means for recycling the first primary hydrocarbon stream to the first combining means;

a first secondary separation device in fluid connection with the first primary separation device, wherein the first secondary separation device is arranged to separate the first concentrated solution stream to a first secondary hydrocarbon stream and a first polymer product stream;

a first secondary recycling means in fluid connection with the first secondary separation device and the first combining means for recycling the first secondary hydrocarbon stream to the first combining means;

a second combining means in fluid connection with the solvent source and arranged to combine the second hydrocarbon stream with a stream of recycled hydrocarbons to a second combined hydrocarbon stream;

a second polymerization reactor train in fluid connection with the second combining means and arranged to continuously polymerize olefin monomer and comonomer in the presence of a polymerization catalyst in solvent to produce a second solution comprising a second polymer of the olefin monomer and the comonomer;

a second primary separation device in fluid connection with the second polymerization reactor train and arranged to separate a second exhaust stream of the second solution withdrawn from the second polymerization reactor train to a second primary hydrocarbon stream and a second concentrated solution stream;

a second primary recycling means in fluid connection with the second primary separation device and the second combining means for recycling the second primary hydrocarbon stream to the second combining means;

a second secondary separation device in fluid connection with the second primary separation device, wherein the second secondary separation device is arranged to separate the second concentrated solution stream to a second secondary hydrocarbon stream and a second polymer product stream; and a second secondary recycling means in fluid connection with the second secondary separation device and the second combining means for recycling the second secondary hydrocarbon stream to the second combining means, wherein the first polymerization reactor train and the second polymerization reactor train are arranged to operate in parallel;

the first primary separation device and the second separation device are arranged to operate in parallel;

the first primary recycling means and the second primary recycling means are arranged to operate in parallel;

the first secondary separation device and the second secondary separation device are arranged to operate in parallel; and the first secondary recycling means and the second secondary recycling means are arranged to operate in parallel.

7. A polymerization arrangement according to claim 6, wherein the first olefin monomer source is in fluid connection with the second combining means; and the first olefin monomer source is arranged to provide second olefin monomer for the second hydrocarbon stream.

8. A polymerization arrangement according to claim 6, wherein the polymerization arrangement comprises a second olefin monomer source arranged to provide second olefin monomer for the second hydrocarbon stream; and the second olefin monomer source is in fluid connection with the second combining means.

9. A polymerization arrangement according to claim 6, wherein the first comonomer source is in fluid connection with the second combining means; and the first comonomer source is arranged to provide second comonomer for the second hydrocarbon stream.

10. A polymerization arrangement according to claim 6, wherein the polymerization arrangement comprises a second comonomer source arranged to provide second comonomer for the second hydrocarbon stream; and the second commoner source is in fluid connection with the second combining means.

11. A polymerization arrangement according to claim 6, comprising a first valve means for selectively opening a passage either:

a) between the first olefin monomer source and the second combining means, or b) between a second olefin monomer source and the second combining means.

12. A polymerization arrangement according to claim 6, comprising a second valve means for selectively opening a passage either:

a) between the first comonomer source and the second combining means, or b) between a second comonomer source and the second combining means.

13. A polymerization arrangement according to claim 6, wherein the first secondary separation device is in fluid connection with the second combining means; and the polymerization arrangement comprises a third valve means for selectively opening a passage from the first secondary separation device to the first combining means and/or to the second combining means.

14. A polymerization arrangement according to claim 6, wherein the second secondary separation device is in fluid connection with the first combining means; and the polymerization arrangement comprises a fourth valve means for selectively opening a passage from the second secondary separation device to the first combining means and/or to the second combining means.

15. A polymerization arrangement according to claim 6, wherein the first secondary recycling means and the second secondary recycling means comprise:

a tertiary separation device in fluid connection with the first secondary separation device and the second secondary separation device and arranged to separate a third combined hydrocarbon stream to a light hydrocarbon stream and a heavy hydrocarbon stream;

a light hydrocarbon recycling means in fluid connection with the tertiary separation device, the first combining means and the second combining means and arranged to recycle the light hydrocarbon stream to the first combining means and/or to the second combining means; and a heavy hydrocarbon recycling means in fluid connection with the tertiary separation device, the first combining means and the second combining means and arranged to recycle the heavy hydrocarbon stream to the first combining means and/or to the second combining means.

16. A polymerization arrangement according to claim 8, comprising a first valve means for selectively opening a passage either:

a) between the first olefin monomer source and the second combining means, or b) between the second olefin monomer source and the second combining means.

17. A polymerization arrangement according to claim 10, comprising a second valve means for selectively opening a passage either:

a) between the first comonomer source and the second combining means, or b) between the second comonomer source and the second combining means.

* * * * *